United States Patent
Woehler (10) Patent No.: US 7,146,234 B2
(45) Date of Patent: *Dec. 5, 2006

(54) METHODS AND SYSTEMS FOR AUTOMATICALLY MODELING A RELATIONSHIP BETWEEN A CONFIGURABLE PRODUCT AND A PLURALITY OF COMPONENTS

(75) Inventor: Christian Woehler, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/025,056

(22) Filed: Dec. 30, 2004

(65) Prior Publication Data

US 2006/0052895 A1    Mar. 9, 2006

(30) Foreign Application Priority Data

Aug. 20, 2004 (EP) ................................. 04077363

(51) Int. Cl.
*G06F 19/00* (2006.01)

(52) U.S. Cl. ........................................ 700/107; 705/29

(58) Field of Classification Search ................. 700/95, 700/98, 97, 105–107; 705/28–29
See application file for complete search history.

(56) References Cited

U.S. PATENT DOCUMENTS

| 2004/0098151 A1* | 5/2004 | Carlucci et al. ............... 700/95 |
| 2005/0038542 A1* | 2/2005 | Kern ........................... 700/105 |

* cited by examiner

*Primary Examiner*—Zoila Cabrera
(74) *Attorney, Agent, or Firm*—Finnegan, Henderson, Farabow, Garrett, & Dunner, L.L.P.

(57) ABSTRACT

The invention relates to a method of automatically modelling a relationship between a configurable product and a plurality of components of the configurable product as a bill of materials, wherein the configurable product and the plurality of components are related to one another by a plurality of selection conditions. The method comprising: providing a processor device; generating in demand planning a plurality of characteristic value combinations representing the plurality of selection conditions, modelling the bill of materials using the characteristic value combinations, and using the bill of material to control the supply of the product.

17 Claims, 4 Drawing Sheets

METHODS AND SYSTEMS FOR AUTOMATICALLY MODELING A RELATIONSHIP BETWEEN A CONFIGURABLE PRODUCT AND A PLURALITY OF COMPONENTS

RELATED APPLICATIONS

This application is based upon and claims the benefit of priority from prior patent application EP 04077363.2, filed Aug. 20, 2004, the entire contents of which are expressly incorporated herein by reference.

BACKGROUND

I. Technical Field

The present invention relates to a method of automatically modelling a relationship between a configurable product and a plurality of components of the configurable product as a bill of materials, a computer system for automatically modelling a relationship between a configurable product and a plurality of components of the configurable product as a bill of material.

II. Background Information

Demand planning is used to forecast the demand for products. One object of demand planning is to plan the demand of products with respect to other product independent characteristics, for example, sales regions, customer channel and location etc. Another object of demand planning and characteristics based forecasting (CBF) is to plan the demand of complex products and their components. This is done by introducing product dependent characteristics for the complex products. An example of a complex product is a computer for which the characteristics computer memory, configuration, hard disc etc, are defined. A complex product is a product having at least one product dependent characteristic, for example, computer memory, configuration, hard disc etc.

Demand planning applications are typically provided on a computer system. Typically, they form a component or module of a supply chain management application, which runs on a computer.

Conventionally, the supply chain management application comprises a number of applications including the demand planning application and the product planning application. Demand planning involves only the planning with respect to characteristics, that is one characteristic for the complex product—or more specifically—the configurable product. A configurable product is a product, for example a personal computer (PC), of which different variants are available. Production planning, on the other hand, involves planning with respect to "real" characteristics, such as product and location.

Conventionally, in order to calculate the materials necessary to make the configurable product the bill of materials (BOM) for the configurable product is required and the BOM has to be exploded in the production planning application.

One drawback of this first conventional approach is that it requires the creation and maintenance of the bill of material and its explosion in different software components. This renders the process difficult to implement and support. Further, this approach when implemented has drawbacks for the user because it is slow and provides limited information to the planner.

Using a conventional demand planning it is possible to define a characteristics based forecasting profile manually. However, this suffers the disadvantage that the manual definition is not a feasible process because it is time consuming and is prone to errors.

A further conventional approach is to generate a characteristics based forecasting profile according to a characteristics class. Such a conventional approach generates for each characteristic of the class a profile planning table which contains in the rows characteristic values. This approach suffers the drawback that the prior art profile generator models the characteristics of the bill of material and not the bill of material itself. Therefore, the generation of the profile with respect to a class is only useable in specific situations. For example, it cannot be used if the bill of material is to be substituted by the profile for calculating the demand for the components. It further cannot be used in order to model selection conditions and the relation of the selection conditions to the components.

A conventional profile generator takes all the characteristics assigned to one class and uses them to create for each characteristic one profile planning table always having the same structure and independent of the bill of material. After the generation, the planning tables can be deleted from the profile but if they do not have the desired structure they have to be created manually and after that added to the profile. In particular, such functionality is only useful for modelling the bill of material if the characteristics of the class model correspond to the assembly groups of the bill of material so that the characteristics can be used as product characteristics. This requires that all the selection conditions of the bill of material specify only one characteristic value and determine uniquely one component product and that the characteristic is always the same for the same assembly group and always different for different assembly groups. In addition, the characteristics and their values have to represent the assembly groups and their components. Thus restricting the user with respect to the bill of materials which may be modelled.

Further, the logistic chain of products between a supplier and end user of the products is compromised. In particular, the control of the supply of goods is compromised. The present invention addresses the problems of optimizing the logistic chain of products between a supplier and an end user of the products. It is a further object to improve the logistic chain with the purpose of keepings costs, including the cost of the products, down. It is a yet a further object to make the supply of products more efficient.

The problems with conventional approaches compromise the accuracy and speed of the demand planning and the ease with which the user can use the system. In particular, it is an object of the present invention to improve the speed with which the demand plan can be generated. It is a further object to improve the accuracy with which the supply of a product in the supply chain can be controlled.

SUMMARY

According to a first aspect of the invention, there is provided a method of automatically modelling a relationship between a configurable product and a plurality of components of the configurable product as a bill of materials, wherein the configurable product and the plurality of components are related to one another by a plurality of selection conditions, the method comprising: providing a processor device; generating in demand planning a plurality of characteristic value combinations representing the plurality of selection conditions, modelling the bill of materials using the characteristic value combinations, and using the bill of material to control the supply of the product.

According to a second aspect of the present invention, there is provided a computer system for automatically modelling a relationship between a configurable product and a plurality of components of the configurable product as a bill of materials, wherein the configurable product and the plurality of components are related to one another by a plurality of selection conditions, the system comprising: a processor device arranged to receive and process data relating to the product, a generating module arranged to generate in demand planning a plurality of characteristic value combinations representing the plurality of selection conditions and a modelling module arranged to model the bill of materials using the characteristic value combinations, wherein the bill of materials is used to control the supply of the product.

According to a third aspect of the present invention, there is provided a demand planning apparatus for automatically modelling a relationship between a configurable product and a plurality of components of the product as a bill of materials, wherein the configurable product and the plurality of components are related to one another by a plurality of selection conditions, the apparatus comprising: a storage medium having recorded therein processor readable code processable to automatically model the relationship between the configurable product and the plurality of components of the product as a bill of materials, the processor readable code comprising generating code for generating in demand planning a plurality of characteristic value combinations representing the plurality of selection conditions and modelling code for modelling the bill of materials using the characteristic value combinations, wherein the bill of materials is used to control the supply of the product.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Figure 1:
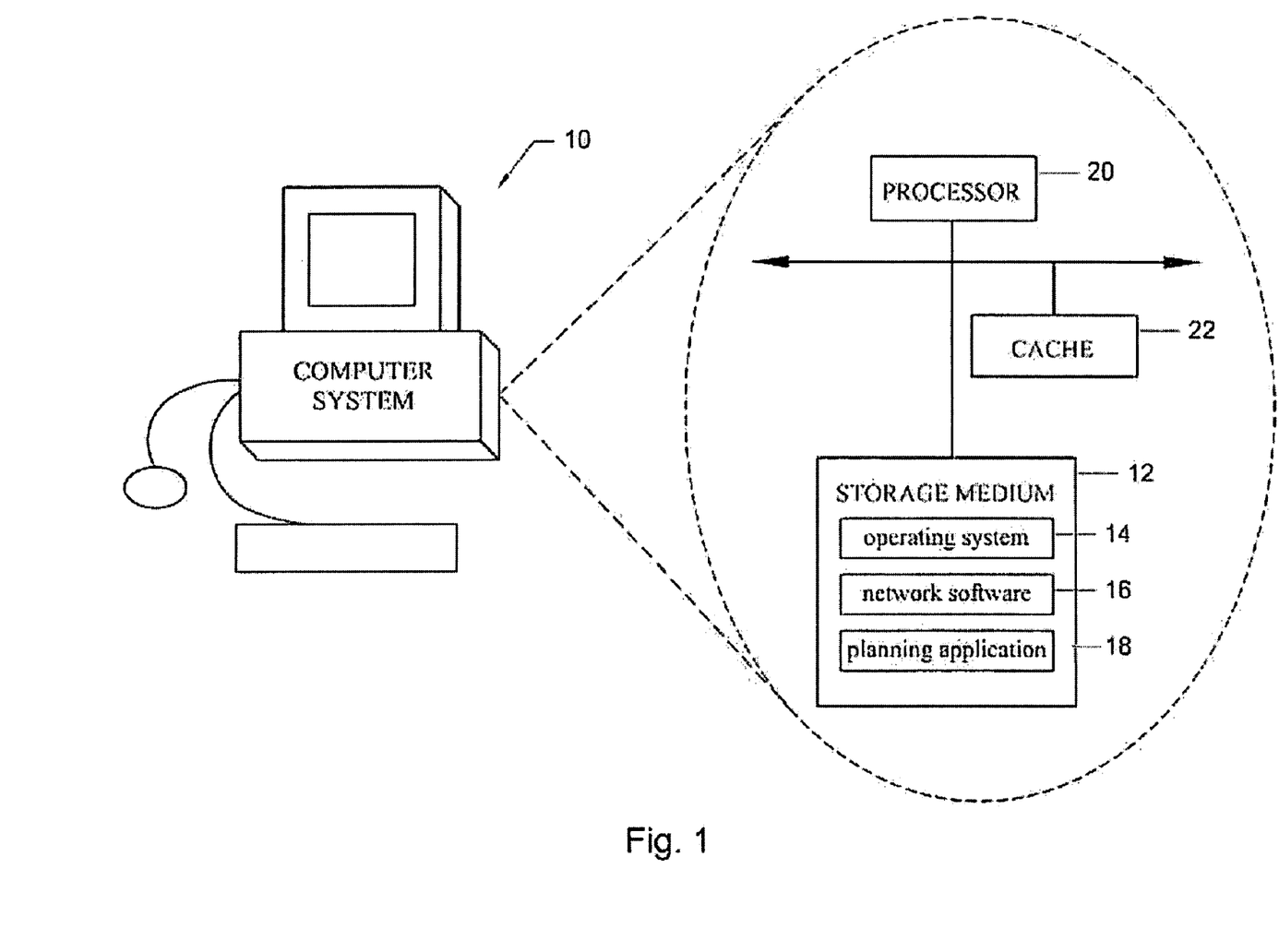
FIG. 1 shows a block diagram of a computer that runs software for managing a supply chain.

FIG. 1 shows a block diagram of a computer that runs software for managing a supply chain. In particular, computer system 10 comprises a hard disk 12 that stores software, such as operating system software 14 and network software 16 for communicating over a network. The hard disc 12 also stores other software, including, but not limited to, planning application 18. In this embodiment, processor 20 executes planning application to perform the functions described. Planning application 18 comprises various software routines for use in supply chain management. To this end, planning application 18 may include a demand planning application including a modelling application. The planning application 18 uses data relating to a configurable product or products. In particular, the planning application 18 uses data relating to the product or products to model a bill of materials. The data includes the characteristics described herein below. The planning application 18 causes the processor to carry out the functions described. In one embodiment, demand plans are stored as data objects in a cache 22 on computer system 10. The cache 22 may for example be the LiveCache described. The characteristics are stored in a data storage system (a database), such as hard drive 12 on computer system 10 or elsewhere. The planning application 18 causes the processor 20 to retrieve data from a data storage element 12, 22. However, the planning application 18 may cause the processor 20 to retrieve the data from any other location. The location of the data storage element is not essential and does not have to form a part of the computer system 10. In one embodiment, pointers are comprised in the data objects in the cache 22 which point to the characteristics in the data storage system. Although the data objects and characteristics are stored on the same machine in the embodiment shown, they may be stored on different machines that are connectable to each other, via, for example, a network, communications link or the like.

In accordance with one embodiment of the present invention, there is provided a computer system for automatically modelling a relationship between a configurable product and a plurality of components of the configurable product as a bill of materials, wherein the configurable product and the plurality of components are related to one another by a plurality of selection conditions, the system comprising: a processor device arranged to receive and process data relating to the product, a generating module arranged to generate in demand planning a plurality of characteristic value combinations representing the plurality of selection conditions and a modelling module arranged to model the bill of materials using the characteristic value combinations, wherein the bill of materials is used to control the supply of the product.

With respect to the demand planning component or module of the supply chain management application, according to one embodiment of the present invention, there is provided a demand planning apparatus for automatically modelling a relationship between a configurable product and a plurality of components of the product as a bill of materials, wherein the configurable product and the plurality of components are related to one another by a plurality of selection conditions, the apparatus comprising: a storage medium having recorded therein processor readable code processable to automatically model the relationship between the configurable product and the plurality of components of the product as a bill of materials, the processor readable code comprising generating code for generating in demand planning a plurality of characteristic value combinations representing the plurality of selection conditions and modelling code for modelling the bill of materials using the characteristic value combinations, wherein the bill of materials is used to control the supply of the product.

According to an embodiment of the present invention, a general logic is provided which enhances the functionality of characteristics based forecasting so that a bill of materials can be modelled in the demand planning component of the supply chain management application. It has been found that with the existing functionality of the CBF planning scenario it is possible to model the bill of material with characteristic value combinations in demand planning. Modelling the bill of material is desirable in order to be able to calculate the components required in order to fulfil a particular the demand plan. It has been found that using characteristic value combinations to model the bill of materials provides the advantage that the bill of materials modelled using the characteristic value combinations may be substituted in the demand planning application. This is desirable since it renders the creation of the demand plan with respect to the components more efficient and direct because it does not rely on objects, such as the bill of material from the production planning application, which are outside the demand planning application. Typically, the bill of material is a complex object.

According to an embodiment of the present invention, rules define how the bill of materials is to be modelled with its assembly groups using the CBF functionality. The rules depend on whether the model is on a component product level, if only one characteristic from the selection conditions is used or if the components together with more complicated selection conditions are modelled in the profile. The generation process carried out by a profile generation module is interactive. It causes several steps to be displayed on a graphical user interface. For example, the preliminary generation results are displayed so that a user can specify the rules concerning how to generate the profile and he may further specify the components which he want to include in the profile, that is the detail level he wants to forecast on in demand planning.

In contrast to conventional approaches which require that the CBF profile be defined manually, the present invention generates the profile automatically. In this way, the bill of materials is modelled faster and with less errors than a manually defined bill of materials.

In demand planning or long term planning, characteristics and corresponding characteristic values can be used to describe in a general and flexible way the supply chain. Characteristics of different types describe different aspects of the material distribution. Some examples of characteristics include geographical aspects which are described, for example, by sales region or location, customer aspects which are described, for example, by customer group, or product aspects which are described, for example, by product family.

Characteristic value combinations CVC are a variable number of uniquely specified characteristic values, for example, sales region: USA and customer channel: internet sales. In demand planning, if all the characteristics used in the supply chain model are specified the CVC is referred to as a detailed CVC. The characteristic value combinations may be stored in the demand planner as master data.

The characteristics are used to model the supply chain. Although it is possible to change the characteristics at a later point in time, typically, they are usually not changed later. The values however can change. For example, if a new product is introduced, this may lead to new CVC. The detailed CVC are master data and within a supply chain management application, for example, a supply chain management application provided by SAP AG, time series are assigned to the data. The master data representing the CVC describe the demand plan values in a particular format. In the particular format, it is possible to define selections. Selections are typically not detailed CVC but specify, for example, only a reduced number of characteristics and represent an aggregate of detailed CVC for the reduced number of characteristics. The aggregate being a summed value of the characteristics. Within the selected CVC the planning is consistent. This means that the demand plan values can be displayed and changed on different levels, for example, on a product group level as well as on a product or other level, and the changes are automatically propagated to the detailed CVC data. Downward propagation is called a disaggregation calculation and upward propagation is an aggregation calculation. The hierarchy with which the data are modelled is flexible and can be changed interactively by navigating using a graphic user interface through the selected data in different ways. For example, changing the number of a particular product planned in the next month for one product leads to consistent changes in the different sales regions where the product is sold. On the other hand changing the number for one sales region changes the values for the products sold there.

The characteristics described hereinabove, including the product characteristic, are called product independent characteristics (PIC).

Further characteristics called product dependent characteristics (PDC) may also be defined. In contrast to the product independent characteristics PIC, the product dependent characteristics PDC are defined specifically for one product. The number of these characteristics can be quite large and they can change over time, for example a characteristic may be added. For example, if assembled finished products which are manufactured with components are considered, it will be appreciated that the assembled products are complex and can be manufactured in many different variants. For such configurable products, it is useful to introduce configurable products which are specified by an evaluation. The evaluation is defined by using product dependent characteristics and by specifying their values uniquely for each characteristic. Typical examples of product dependent characteristics are defined, for example, for automobiles which may have product dependent characteristics such as colour or engine size or for computers which may have product dependent characteristics such as memory size and/or hard disc, since automobiles and computers may be manufactured in many different variants. As with product independent characteristics, product dependent characteristics have a CVC, that is a variable number of uniquely specified characteristic values.

Figure 3:
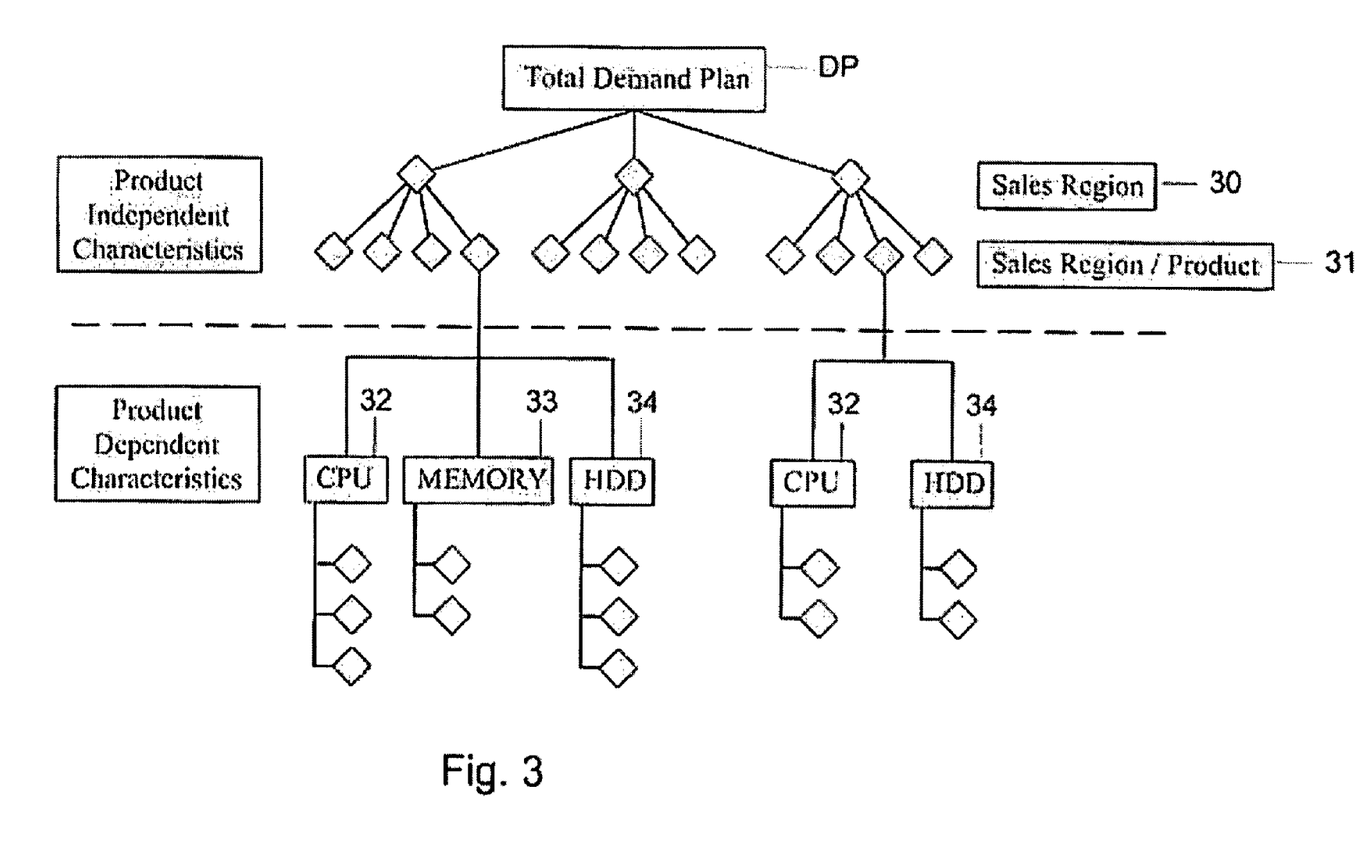
FIG. 3 shows a structure of characteristics in a supply chain for configurable products and components.

FIG. 3 shows a structure of characteristics in a supply chain for configurable products and components. In particular, FIG. 3 shows a total demand plan DP. In order to determine the total demand plan, product independent characteristics PIC are used such as "sales region" 30, "sales region/product" 31, etc. The product independent characteristics are modelled using standard demand planning. The total demand plan DP is generated taking into account product dependent characteristics PDC, such as "CPU (central processing unit)" 32, "memory" 33 and "HDD (hard disc drive)" 34 etc. The product dependent characteristics are modelled using characteristics based forecasting.

Figure 4:
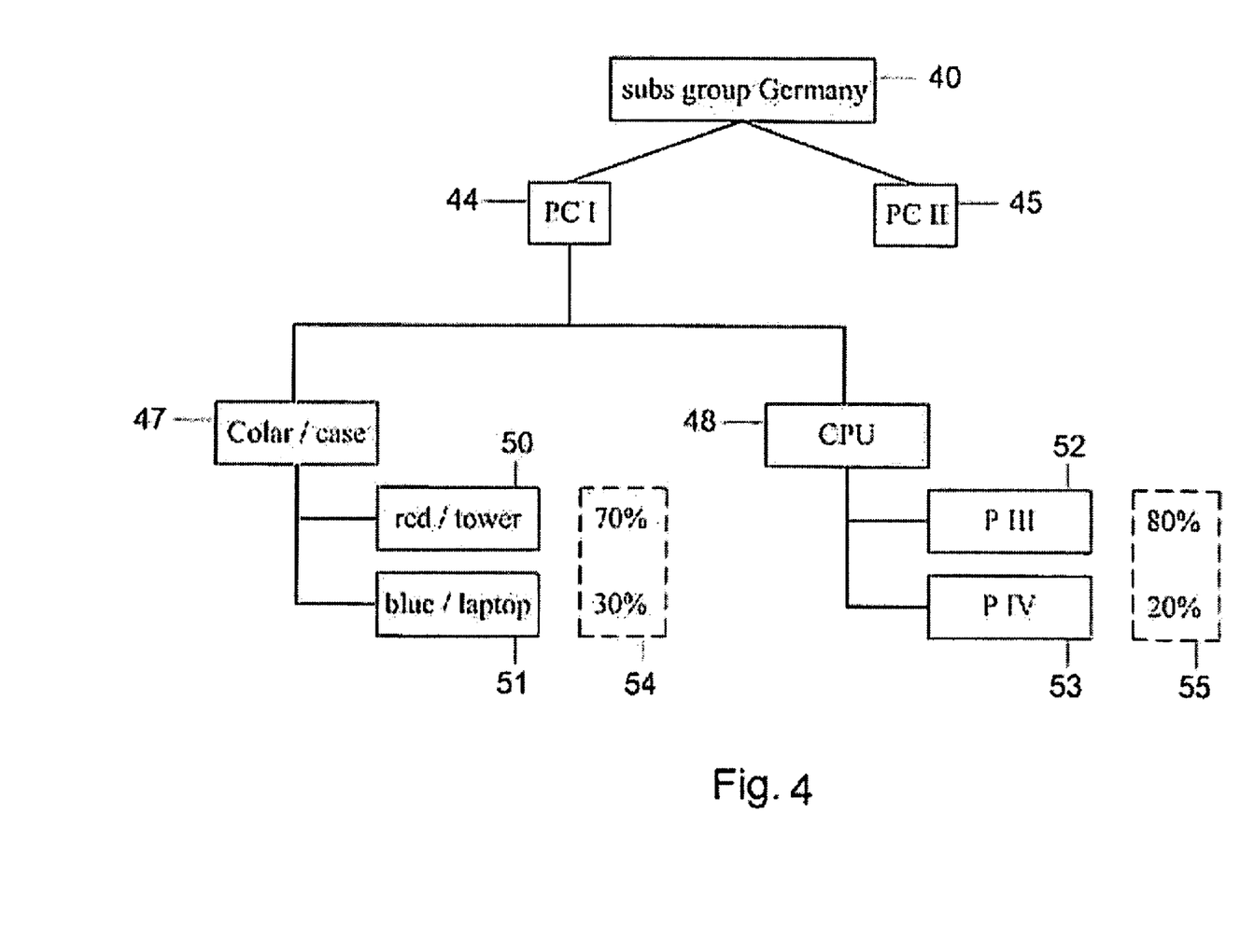
FIG. 4 shows an example of a consistent characteristics based forecasting planning in demand planning.

FIG. 4 shows an example of a consistent characteristics based forecasting planning in demand planning. For the sales group "Germany" 40, it is desired to plan on the planning level 42 for two products: PC1 44 and PC2 45. It is desired to plan for 100 PC1 computers 44. The PC1 computer 44 has three product dependent characteristics: "color/CASE" 47 and "CPU" 48. It is planned that each PC1 computer has a "color/CASE" 47 and "CPU" 48. Hence, 100% of PC1 computers have a color/case and 100% of PC1 computers have a CPU. The characteristics have characteristic values 49: the color/CASE may have the characteristic value "Red/Tower" 50 or "Blue/Laptop" 51. Further, the CPU may have the characteristic value "PIII (Pentium III)" 52 or "PIV (Pentium IV)" 53. It is planned for the PC1 computers that 70% are a red tower and 30% are a blue laptop. It is further planned for the PC1 computers that 80% have a PIII chip and 20% have a PIV chip. In FIG. 4, the consistency calculation is shown, that is the upward and downward propagation of changes for absolute values. Further, the transactional data is stored on the level of the characteristic values.

In demand planning a demand plan is modelled for a supply chain of configurable products including their components. An embodiment of the present invention uses a component called characteristics based forecasting (CBF). CBF is a component of a software product for supply chain management called SAP Advanced Planner and Optimizer (SAP APO). CBF enables a user to define a profile for any product. The profile has a predetermined structure. For example, the profile contains profile planning tables (PPT) which have as entries the CVC of one or more product dependent characteristics (PDC). The structure allows entries to be made in lines, table rows or the like. The profile planning tables are stored in a storage element, for example an object-oriented database, such as LiveCache 22, which is the storage system of the APO.

The structure of the profile planning tables is general. For example, it is possible to use the same characteristic in different profile planning tables. Characteristics which are in one profile planning table are called dependent characteristics and if they are in a plurality of different profile planning tables they are called independent characteristics. The reason for this is that the demand plan values are stored on the level of the PPT lines only and if the value for a CVC which contains independent characteristics is to be displayed the result is calculated by multiplying the corresponding proportions. For example, if 50% of a car model are red and 10% have four doors, then the number of red cars with four doors is calculated to be 5%. This however, need not be precise if there is a strong correlation between colour and the number of doors of the car. The calculation of the result assumes that the characteristics are statistically independent. If this is not the case and the statistical error is not acceptable the corresponding characteristics have to be planned in one profile planning table. The combination of different characteristic values however usually increases the number of profile planning table lines and with it the amount of data stored in the storage element, such as the LiveCache.

The CBF component provides an automatic transformation between the product's product dependent characteristics which are used in demand planning and the internal characteristics for profile, planning table, and the planning table rows which define the manner in which the data are stored.

After generating the demand plan it is possible to release the data from the Demand Planning application to the Production Planning application and explode in the Production Planning application the BOM according to the demand plan values of the CVC of the product dependent characteristics.

Typically, the relation between assembled products and their components is specified in the bill of material BOM. This is a complete list of all possible input products. Selection conditions describe when an input product is required for the manufacturing of the finished product. The selection conditions define particular conditions for different product dependent CVC which have to be met by the evaluation in order to consider the corresponding input product for production. These conditions can be very complicated when several different characteristic values are related by different logical operators, such as "and" or "or". However, they may also considered as being transformable into a disjunctive normal form which specifies only different CVC and connects them in a particular way with "and" and "or" relations. In particular, the disjunctive normal form connects conjunctions only by the "or" relation and the conjunctions consist of unique characteristic value specifications which are connected by the "and" relation.

As mentioned above, in conventional supply chain management, the BOM is "exploded", that is the list of materials is obtained, in the production planning module of the supply chain management application when the requirements for the assembled product are to be fulfilled and all the components and activities are determined in order to achieve this. Typically the production planning module processes the data once the demand planning carried out by the demand planning module is complete. After the explosion all the required components are calculated and their procurement can be triggered.

Thus, it is possible to plan in Demand Planning the product independent characteristics and the product dependent characteristics and use the BOM to relate the components on a material level to the forecast of the assembled product. However, it has been found that often the product dependent characteristics evaluated in the selection conditions of the BOM are too technical and too complicated to be used in demand planning. Instead, according to an embodiment of the present invention, the components are modelled with an additional introduced product dependent characteristic or characteristics which is or are defined to directly describe the components without using selection conditions. Further, it has been found that the BOM usually contains too much information for planning the relevant components only. Relevant components are components which are either very valuable, have to be procured in advance or specify an important feature of the finished product. In contrast to this the BOM specifies all the possible components including bulk materials. Further, the BOM is an additional object of Production Planning and is alien to demand planning. Thus, the BOM explosion does not allow a consistent planning of the components in real time. In demand planning, it has been found that the user seems to face the situation that either a BOM already exists but it is not suitable for an efficient demand planning including the components or that he has to create a BOM only for relating the components to the assembled product in the production planning.

It is commented that in Demand Planning the component, demand planning bill of materials DP BOM exists which employs a simplified BOM in order to model fixed relations between output, i.e. assembled, and input products, i.e. components. This functionality however cannot be used to actively plan the components for the assembled products since the relation is always fixed and it is used only for disaggregation: the value for the output product is entered and leads to a fixed value for the input products. This means that it is not possible to use the DP BOM functionality for planning configurable products for which the output-input relation has to be flexible. Also, in the DP BOM, the input products are represented strictly on the product level and therefore it does not allow to model groups of similar components, for example, assembly groups.

The present invention uses the concepts mentioned above and uses characteristics in demand planning as far as possible in order to model the assembling of finished products. This is achieved using a more general concept which is not refined to any specific implementation in demand planning or production planning. In particular, according to an embodiment of the present invention, CVC are used in order to model assembled products and the relation to their components without relying on additional objects, such as the BOM with its components. Further, selection conditions as an independent object are substituted by a system of CVC comprising product dependent characteristics.

The consistency calculation for the CVC substitutes the BOM explosion, that is the component demands are derived from the demand for the finished product and its characterization.

The present invention, which also includes the modelling of the selection conditions, is beyond a mere output-input relation on product level. In the following the general rules how to define the system of CVC in order to model the BOM are described. The description also includes how the aggregation and disaggregation calculation and the characteristic consistency calculation are able to model the BOM explosion.

The advantages of the present invention is that the whole supply chain from global aspects up to the last relevant components can be described consistently within one system of CVC. Product independent characteristics and product dependent characteristics can be used in order to forecast the demand, for example, for a particular sales region and derive from this the number of components which have to be procured. It is possible to use historical data together with forecasting methods to calculate the numbers on the detailed level and possibly check them immediately against restrictions of procurable components. If there is a conflict the demand plan can be adjusted and checked again in real time. The substitution of the BOM by product dependent characteristics has also the advantage that more information about the finished product and component relation are available: the aggregation calculation directly propagates changes on the component level to the finished product level and even further upward to the product independent characteristics.

The core demand planning process is finished with the creation of the global demand plan for the assembled products and their components. It remains to extract the relevant data from the demand planning component and use the results in order to trigger the procurement or the manufacturing of the components in the required number or to analyze or process them for a different objective. This is partly possible by using standard data extraction functionality of the Demand Planning. However, in addition to defining the appropriate extraction level which gives the demand plan values on the component level, according to an embodiment of the present invention, the characteristic values of the component product names are mapped to the appropriate objects which contain the product names. After this the demand plan results are transformed to requirements for certain location products and certain dates. Typically, the results will be sent to other components or systems used for the executing the further processing of them.

The modelling of the bill of materials with characteristic value combinations is herein below described according to an embodiment of the present invention.

The modelling of the BOM with product dependent characteristics is carried out in the following way. The CBF profile is used to describe the BOM structure and the profile planning tables are defined so that each table describes one group of components, that is an assembly group. A group of components is a set of similar components which are different specifications of the same feature. For example, the different possible engines of a car as products are a group of components with respect to the feature "engine of the car".

The characteristics of each profile planning table preferably comprise one characteristic for the product name. Other characteristics can be added to the profile planning table for the product description from the material master and for other product descriptions which are more appropriate for demand planning. The relation between the characteristic values for the different characteristics of one profile planning table mentioned so far is one to one, i.e. the product name corresponds unambiguously to one value for any of the product descriptions and one product description specifies uniquely one product name. Therefore, preferably, every characteristic value occurs only once for each characteristic in the profile planning table.

There are also other, additional characteristics for which the values occur more than once in the lines of the profile planning table. They represent only an incomplete characterization of the component which does not determine the component unambiguously. They are useful to further group the components in order to e.g. allow for an aggregated or grouped representation. An example of an incomplete characterization can be the CPU of computers which have an additional characteristic of "brand" with the values "Intel" and "AMD", which are manufacturers of computer components. The brand does not specify uniquely the CPU type for which more information is required, for example, the tact frequency, but it allows the user to aggregate the demand plan data on the level of the CPU brand and thus to display, analyze, and maintain them on separately for the Intel CPU and AMD CPU.

A further function of the additional characteristics, such as the additional characteristic "brand", is the modelling of the selection conditions of the object dependencies in the BOM. As mentioned above the selection conditions are based on the evaluation characteristics of the configurable product and the evaluation characteristics can be the relevant characteristics also in Demand Planning. This can mean the user prefers to work with the additional characteristics and is less interested in the product name of the component. It can also be used in order to map the sales orders with their evaluations to the component demands required to assemble the sold finished products. With the appropriate definition of the additional CVC in the profile planning table it is then possible to model the disjunctive normal form of the selection condition which is the allowed kind of object dependency. In particular, with the additional CVC it is possible to model all kinds of disjunctive normal forms and that the selection conditions which are considered in this context can always be transformed into a disjunction normal form, i.e. there is no restriction implied in the present modelling. It is the combination of the product characteristics specifying the component products and the additional characteristics describing the selection conditions which allows the substitution of the BOM and the BOM explosion by the CVC and the consistency calculation. Further, the consistency calculation allows also the "inverted" BOM explosion which means that changing the values on component product level changes accordingly the values on selection condition characteristics level.

The selection condition is modelled in the following way: the characteristics of the conjunctions, that is the characteristics which are connected by an "and" operator have all to be defined within the profile planning tables. One line of the profile planning table represents then the conjunction where the product name is specified in the product characteristic and the additional characteristic values are the ones from the respective conjunction. If the selection conditions contains more than one conjunction, that is also "or" relations, another line is added to the profile planning table for the same product name but it is different in that the additional characteristics represent again the different conjunction. In this way one component after the other of the assembly group with its individual selection condition can be added to the profile planning table. It has further been found that adding the individual selection conditions may be cumbersome if the conjunctions contain many different characteristics. In this case the profile planning table can become large. To overcome this particular problem, it has been found that if different characteristics are specified in the conjunctions, in addition representative values are introduced for the non-specified characteristic values of the conjunctions.

An example for modelling such a selection condition is given below for the assembly group "CPU" and for the product "3711" with the description P4-3 GHz (which is a type of CPU) and the selection condition defines: take this component if CPU-brand=Intel and frequency=3 GHz or if edition=high end. The profile planning table for the assembly group CPU and the characteristics CPU-product, CPU-description, CPU-brand, CPU-frequency, and CPU-edition then contains the following two lines: CPU-product/3711, CPU-description/P4-3 GHz, CPU-brand/Intel, CPU-frequency/3 GHz, CPU-edition/unspecified and CPU-product/3711, CPU-description/P4-3 GHz, CPU-brand/unspecified, CPU-frequency/unspecified, CPU-edition/high end. In this example it can be seen how different selection condition characteristics add up in the profile planning table of the assembly group.

In order to show how the consistency calculation works between the product characteristics and the additional characteristics, the following examples are given. Let it be assumed that a product occurs in the profile planning table in several lines and there are more than one additional characteristic. Entering a value for the product then results in a disaggregation of the value to all the lines of the profile planning table where the component product is defined. The disaggregation can be according to different rules, for example, a pro rata disaggregation or a disaggregation with respect to a different key figure. This is not important since the disaggregation logic is the same as in the standard Demand Planning. However, according to an embodiment of the invention, the changes are correctly propagated to all CVC of the additional characteristic according to the new value for the component product. Further, this is carried out in real time. In addition to the disaggregation calculation to the detailed CVC the aggregation calculation with respect to the displayed data also propagates the change. If, after the change of the value of the component product, for example, one additional characteristic value which is also specified in the additional CVC of the changed component product is selected and displayed all the lines of the profile planning table which match this characteristic value are aggregated and incorporate the propagated change to the detailed CVC. On the other hand if now the value for the one selected additional characteristic value is changed all the component products for which the additional CVC matches this value are changed according to the proportions by which they contribute to the changed characteristic value.

A further example is given to further illustrate the embodiment described above. The example of a configurable computer is given. The computer can have different CPU values which describe a group of components. There are also two additional characteristics which are "processor type" and "tact frequency". The following three components are considered here: product 4711 with type P3 and frequency 1 GHz, product 4712 with type P4 and frequency 2 GHz, and product 4713 with type P4 and frequency 3 GHz. If the demand plan value for product 4711 is changed from 0 to 100 the change is directly written to the first additional CVC and the value for P3 is also raised from 0 to 100—as it is the case for 1 GHz. If the value for P4 is changed from 0 to 100 the change is disaggregated to the two last CVC by e.g. giving each combination the value of 50. The result is that the number of product 4712 is raised from 0 to 50 and of product 4713 from 0 to 50. Further examples of more complex configurable products work in the same way and it can be seen that the consistent calculation is able to map correctly between the component product name and the additional CVC describing the selection condition. The consistent calculations are very efficient and are able to propagate changes to many profile planning tables which also contain a large number of lines.

In one embodiment of the present invention, the requirement in conventional demand planning is addressed that all the characteristic values which are defined for one planning table have to be defined for the other planning tables which contain the same characteristic. In one embodiment, this requirement is enhanced. This is achieved by providing a plurality of secondary characteristics based forecasting profile planning tables SPPT in each of which a header characteristic is defined. The header characteristic comprises a reduced number of characteristic values in the enhanced planning table, that is not all the characteristic values which occur in the primary profile planning tables PPT previously described are necessarily included in the secondary profile planning tables. One of the header characteristics specifies uniquely the component which the secondary profile planning table is assigned to in order to model its input products.

In a further embodiment of the present invention, one further problem that is addressed is that the conventional universal consistency condition requires that the sum for all the values of one characteristics based forecasting characteristic is always the same for all the CBF characteristics and that it is equal to the total for the assembled product. Related to this problem is the fact that before all profile planning tables were treated in the same way and in the propagation calculation the sequence with respect to planning tables was irrelevant. According to an embodiment of the invention, a plurality of secondary profile planning tables with header characteristics are generated. The secondary profile planning tables are exempt from the standard consistency calculation. Instead their values are calculated in additional routines performed by the processor when executing the planning application 18. The secondary profile planning tables are also numbered with respect to the level of the bill of materials which they describe: each conventional (primary) profile planning table has the number zero and the standard calculation routines apply to them without change. The plurality of secondary planning tables which model an assembled components which are part of the standard planning tables are assigned the number one. In a further embodiment, secondary profile planning tables with header characteristics are assigned the number from the planning table which their header characteristic refers to increased by the value of one. In this way a hierarchy is created which specifies the sequence by which the planning tables have to be processed by the processor device 20. In a disaggregation calculation the planning tables with the lowest value are calculated first and the sum for planning tables with non-zero value is calculated according to the header characteristic value combinations from the "higher" planning table with the lower number. For example, a car has the component 100 kW engine and the engine is represented by one line in the planning table for characteristic "engine". This is the higher planning table because the engine is assembled and therefore it is also represented by a header characteristic value in the secondary profile planning table (SPPT) with the characteristic, for example, "cylinder valves". Once this has been carried out the sum is disaggregated to the planning table describing the assembled component. In the aggregation calculation, that is the detail of a planning table with a header characteristic is changed, planning table which header characteristic refers to is calculated first. Once the zero level of the planning tables is reached in the calculation the transfer calculation which affects the other zero level planning tables is executed. The transfer calculation transfers the change of the sum of one standard profile planning table to all the other planning tables of the profile and thus ensures the standard consistency requirement. After the transfer calculation the disaggregation calculation is done with respect to the non-zero level planning tables which were not calculated in the previous aggregation calculation.

Herein below the modelling of assembled components is described in further detail. As mentioned, it may occur that components of assembled products are also assembled and that they have components. In such as case, it is desirable that the components of assembled products which are themselves assembled be included in the consistent planning of the demand. This is more often the case for companies producing complex finished products and such processes are supposed to be modelled with CBF. In these scenarios there are also components of components which have again input products and consequently there are several additional levels in the BOM structure which should be available for modelling with CVC. A typical example is the production of fork lifts which are highly configurable according to their use and which have a mast which is configurable itself.

As mentioned, according to an embodiment of the invention, to deal with such cases a plurality of secondary profile planning tables SPPT are generated. The secondary profile planning tables SPPT are additional objects, not found in conventional demand planning, and are defined in a particular way. The user specifies that he wants to create a SPPT when maintaining the profile. He is then invited to specify a header characteristic value. The header characteristic value is one which occurs in one of the primary PPT assigned to the current profile. The header characteristic value preferably represents the assembled component. In the example above it could be a mast with product name "5711". The SPPT may also contain CVC but for the SPPT they are always linked to the one header characteristic value—in contrast to conventional PPT which represent independent components in the context here.

Internally, the planning application 18 causes the process to the SPPT so that it is partly modelled by a conventional PPT where the header characteristic is included in the PPT but it only contains the one header characteristic value. In the conventional implementation of the CBF functionality this is not allowed since the characteristic values have to be consistent in all PPT of one profile. This means that all the values for one characteristic have to occur in all the other planning tables in which this characteristic is included. In order to generalize the characteristic consistency requirement the CBF calculation routines are modified on the lowest level. The sum of the values for all characteristic values of one SPPT characteristic are not equal anymore to the sum of the values of other conventional PPT characteristics and also not to the sum of the configurable product. The same is true also for the sum of all the lines of a SPPT which is in general different from the conventional PPT sums. It should be added that in the case of the component oriented logic the delta characteristic value has to be included on the summation over the characteristic values—even if it is not displayed and known only internally.

The disaggregation calculation of the SPPT is carried out in the following way: the values which are given for the header characteristic value are disaggregated to the CVC of the SPPT according to the standard disaggregation logics available for CBF, for example, a pro rata disaggregation or disaggregation with respect to another key figure. However, there is a difference in disaggregation calculations for profiles which contain SPPT. The values for the header characteristic value have to be known first and therefore all the conventional primary PPT are calculated first and only after that the disaggregation for the SPPT is carried out. For the aggregation calculation, that is the value for one SPPT CVC is changed, the distinction between whether the PPT is a primary (conventional) PPT or secondary PPT is also identified and taken into account in the processing. In particular, the more detailed values of the changed SPPT are summed first but after that the values of the conventional primary PPT to which belongs the header CVC of the SPPT is calculated next. Only after this the transfer calculation with respect to the other conventional PPT can be executed.

Internally, the required coding changes in order to process the primary and secondary PPT are implemented in the planning application 18.

In particular, the data are stored for CVC using three internal characteristics for profile, table, and row. Further, a logic for SPPT calculations defined in the planning application 18, further, the consistency calculations which the planning application 18 causes the processor device 20 to carry out, are modified with respect to the aggregation, disaggregation, and transfer calculation. Further, the transformation between the internal representation of the data and the application data of the user are enhanced for the SPPT, too. Further, the planning application 18 is coded so that the processor carries out the disaggregation, aggregation, and transfer calculation in the appropriate order, whereby PPT and SPPT are calculated first and after that the next PPT and SPPT according to the respective header values. This is achieved by assigning a numbering to the PPT and SPPT according to the level they describe in the BOM. The PPT all get the number zero and the SPPT describing an assembled component of the finished product are assigned the number one. SPPT describing the next level assembly groups, i.e. components of a component which again is used for a component of the finished product are assigned the number two. This numbering logic is applied to all the SPPT and models a component hierarchy which allows to determine the sequence of all the consistency calculations. The transfer calculation which takes care that the sums for all PPT are equal and that they are also equal to the total for the finished product is done only for the zero level planning tables, i.e. the conventional PPT. The disaggregation calculation is done for the changed planning table first and then it is continued to all the dependent SPPT with the next higher level number. The aggregation calculation is also done first for changed planning table and it is continued to the next lower level number planning table. When the zero level is reached the aggregation calculation is finished and it follows the transfer calculation which is done for the zero level and then the disaggregation calculation is done for the SPPT assigned to the other conventional PPT.

A component oriented logic also for SPPT may also be defined. Further, the characteristic value of a SPPT may be specified again as a header characteristic value and a new SPPT may be assigned to it. In this case the disaggregation calculation requires the numbering of the SPPT with the level described above. In this way several levels of components can be modelled—which is also called nested configurable products. In a further embodiment, two or more SPPT are assigned to the same header characteristic value. This provides a further advantage, since the assembled component may comprise more than one component group.

As mentioned above the Demand Planning data are stored in a data storage medium 12, 22 on the level of the internal CVC which comprise in the case of CBF three characteristics for profile, table, and row. CBF characteristics which are in different PPT are called independent characteristics because if a combination of them is calculated the proportions are multiplied—as if they were statistically independent. According to an embodiment of the present invention, the characteristics of the SPPT are independent of the header characteristic value. To further exemplify the consequences of this the fork lift example is taken up again. It is assumed that the mast "5711" can be used for two different fork lift configurations which are different with respect to the engine. But in the case of the diesel engine the mast has to be different with respect to its components from the case of the electric engine. The influence of the selection of the engine on the mast cannot be taken into account because the SPPT CVC are independent of the engine value. The mast components and their distribution are the same for the diesel and the electric engine because values for the mast and for the components are stored in different PPT. Thus, the precision of the planning data is restricted. The present invention according to one embodiment addresses this restriction in the following advantageous way. According to an embodiment of the present invention, instead of defining just one header characteristic value it is possible to define a header CVC. In this way the SPPT describing the mast components can be different for the different masts and also for the different engine values. This requires the definition of header CVC which specify all the relevant characteristic values and all the relevant characteristics have to be in the same PPT. In the example, the planning application 18 defines one SPPT for the header combination diesel engine and mast "5711" and a second SPPT—possible with different combinations—for the electric engine and mast "5711". Planning the engine and the mast as dependent characteristics can however increase significantly the number of lines in the respective PPT. If there are also other characteristics on which the mast configuration depends they are also added to the PPT. Typically, the number of lines of one PPT increases exponentially with the number of characteristics because adding one characteristic usually means that number of lines is multiplied by the number of values of the new characteristic. Since for every PPT line there is one time series they increase in the same way. This is different with independently planned characteristics where the number of time series is just the sum of all the characteristic values. In addition to this, the number of SPPT increases also with the number of header CVC increasing also the memory requirement for the storage medium, LiveCache 22.

Further, in a more complex BOM it may also occur that the same group of assembly products is used several times for different components or for the same component which is used more than once in the same BOM. The second case leads to a characteristic value which appears in different PPT. Both the two cases can be modelled in an efficient way by using the same SPPT CVC but with respect to a different header CVC. The header CVC has to be different in both cases because otherwise the values for the individual SPPT CVC would have to the same even if the header CVC value is different for the different PPT which it is defined for. The reason is again the way the application values are calculated from the stored values for characteristics which are in different PPT—even if it is the same characteristic.

Hereinbelow the profile generation function for modelling the bill of materials is described in further detail. The function is achieved using a software module, that is a profile generation module, which, when executed, causes the processor to carry out the profile generation function. The task of the profile generation function, as embodied in the profile generation module, is to analyze the bill of material and to automatically generate a plurality of characteristic value combinations which model the bill of materials. The general concept of how the bill of materials is modelled with characteristic value combinations is described hereinabove. In short, product characteristics are used to describe the components on a product level and additional characteristics are introduced in order to describe the selection conditions. Characteristic value combinations comprising both types of characteristics allow the representation of quite general object dependencies which relate the appropriate components to the specification of assembled products in the bill of materials.

The selection with respect to the optimum way to model the BOM depends to a certain extent on the requirements of the user. However, the assessment of the solution by the processor determines the memory requirement and the performance so that the model is created efficiently. To this end, the processor is arranged to carry out the assessment so that the user is able to look first at the generation results and to modify them before they are saved. This functionality, provided according to an embodiment of the invention, is compliant with the way CBF profiles are maintained.

The profile generation function, as implemented by the profile generation module when executed on the processor, requires specifying a bill of materials which is to be modelled. In response, the profile generation module then creates a first preview where for every assembly group of the bill of materials there is created a profile planning table. In fact, the profile planning table created by the profile generation module does not necessarily comprise the whole profile planning table, but preferably comprises only the header of it with the name taken from the assembly group name. The generation module then gives the user the opportunity to delete some of the profile planning table or rename them and then may specify if the remaining profile planning tables only comprise product characteristics or also additional characteristics for the selection conditions. After that the user is able to continue with the next preview which is generated by the profile generating module according to the user input, and displays the result for the preliminary profile planning table with its characteristics only. In a further embodiment, the profile generation module allows characteristics to be deleted from and/or added to the displayed PPT. The next step carried out is that the generated PPT with their generated rows containing the CVC are displayed. The characteristic values which are known are displayed and can be changed, if desirable, and the characteristic values which are not known are maintained manually at this stage. When the characteristic value combinations are completed the generated profile is finished and can be saved as a standard CBF profile.

It is commented that conventional CBF profile maintenance allows lines to be added and/or deleted to the profile planning table. The profile generation function defines the structure of the profile and the profile planning table. Further adjustments can be completed later using the existing functions.

The product characteristics used in the profile planning table are generated. Further, in order to minimize the manual steps for a standard profile generation, the profile generation module may cause the processor to carry out the following procedure, when executed: before the profile planning tables with their characteristics are generated, the user may specify the number of product characteristics he wants to define in all the profile planning tables. After that he may define a string for each product characteristic name and specify if the string is put in the beginning or in the end of the generated characteristic name. The given specifications are valid for all the profile planning tables but they are only default values for the next generation step. The results of the next step can be changed for each profile planning tables individually. The characteristic name is generated by concatenating the string and the name of the profile planning table in the defined way, i.e. either by first appending the string to the profile planning table name or the profile planning table name to the string. In this way the profile contains only different product characteristics allowing a unique identification of the profile planning table they belong to. The first product characteristic is assumed to be the product name characteristic and its values are automatically generated from the component product name of the bill of materials. The other product characteristics are either used as descriptions or attributes or they are used in order to be able to group the components with respect to certain criteria. The naming of the characteristics may be of significance since often the list of all characteristics of many assembled products is displayed in an alphabetical order and a consistent naming simplifies the orientation.

An example is given below to further exemplify this function. The case is taken in which only two product characteristics are used in the profile planning table. In this example, the first characteristic for the product name is generated containing the name of the profile planning table followed by the string "_product" and the second product characteristic is generated with the profile planning table name and the string "_description". The values of the first characteristic of the profile planning table are the product names of the products of the assembly group and the values of the second characteristic can be taken from the corresponding product descriptions. However, it is possible to add a further characteristic to any of the generated profile planning tables for which the values are maintained manually. It also is possible to delete one of the two product characteristics for the one or the other profile planning table.

The product characteristics are generated but this poses no consistency problem because they only appear in the profile planning table and are not integrated in any of the existing characteristic systems defined in, for example, the Advanced Planner and Optimizer (APO) application available from SAP AG. However, by adding them to the CBF profile they will be indirectly added to the technical characteristic value combinations of the planning object structure and consequently appear in the Demand Planning components.

In a further embodiment, also additional characteristics as hereinabove described, may also be contained in the profile planning table, thus modelling the selection conditions of the bill of materials. In this particular embodiment, the characteristics which are used in the selection conditions are added to the profile planning table. Further, the selection conditions are transformed to disjunctive normal forms and entries in the profile planning table are defined according to the description above: that is each conjunction is represented by one profile planning table line with the same product characteristics values for all the conjunctions of the respective component but with different additional characteristic values according to the detailed specifications of the individual conjunction.

A problem which can arise using additional characteristics is that there can be quite a lot of them and it can occur that the conjunctions specify different characteristics. In this case the profile planning table contains many characteristics and many lines of them have a value in different characteristics which represents a non-specified characteristic value. To address this problem, according to an embodiment of the invention, as mentioned above, the profile generation module offers the user to opportunity to delete characteristics from the profile planning table in order to simplify it. In addition, the profile generation module carries out a check to ensure that each line of the profile planning table is a unique characteristic value combination. The additional characteristics and their values occurring in the profile planning table are not unknown to the supply chain management system since they are defined already for the bill of materials. Therefore they belong to a characteristic system and do not have to be generated. Thus, no additional user input is necessary.

As hereinabove described, a generation module may be provide to generate a secondary profile planning table. According to a further embodiment, the same procedure as described above for the profile planning profile may also be used for the generation of the SPPT with the additional feature that if the same component occurs in different assembly groups, i.e. the same header characteristic value occurs in different PPT the names of the assigned SPPT are varied. The reason for this is that otherwise the demand plan values would be the same for the SPPT CVC regardless of the PPT the header characteristic value belongs to. The default setting is that only one characteristic value is taken as the header CVC but this can be changed in the preliminary generation result, too. The way the SPPT are generated is that the first characteristics are taken from the header CVC and their values are the header CVC values. Therefore for each SPPT the values in the header characteristics are always the same for all lines of the SPPT. For characteristics which have more than one value this feature is only possible for SPPT. The other characteristics not belonging to the header CVC are generated according to the rules described above for generating a PPT for an assembly group.

After the preliminary generation result has been adjusted the user can save the profile. Once the profile is saved, the supply chain management application treats the profile as any conventional profile. This provides the further advantage that no existing CBF functionalities have to be changed as a result of the profile generation functionality as implemented by the profile generation module. The PPT and SPPT are distinct objects in the CBF scenario and they can be used also for other profiles which can lead to the further advantage of a significant time reduction for the creation of any subsequent profiles.

A further feature of the bill of materials as well as of the CBF profile in the supply chain management application is that both of them can be time dependent. Thus, it is possible to add new assembly groups or new components to the bill of materials and also to delete them, too. The same is possible for the planning tables of a profile and for the CVC contained in them. The profile generation function, as implemented by the profile generation module, is able to map the time dependence of the bill of materials to the time dependence of the profile. The mapping may be carried out exactly.

Figure 2:
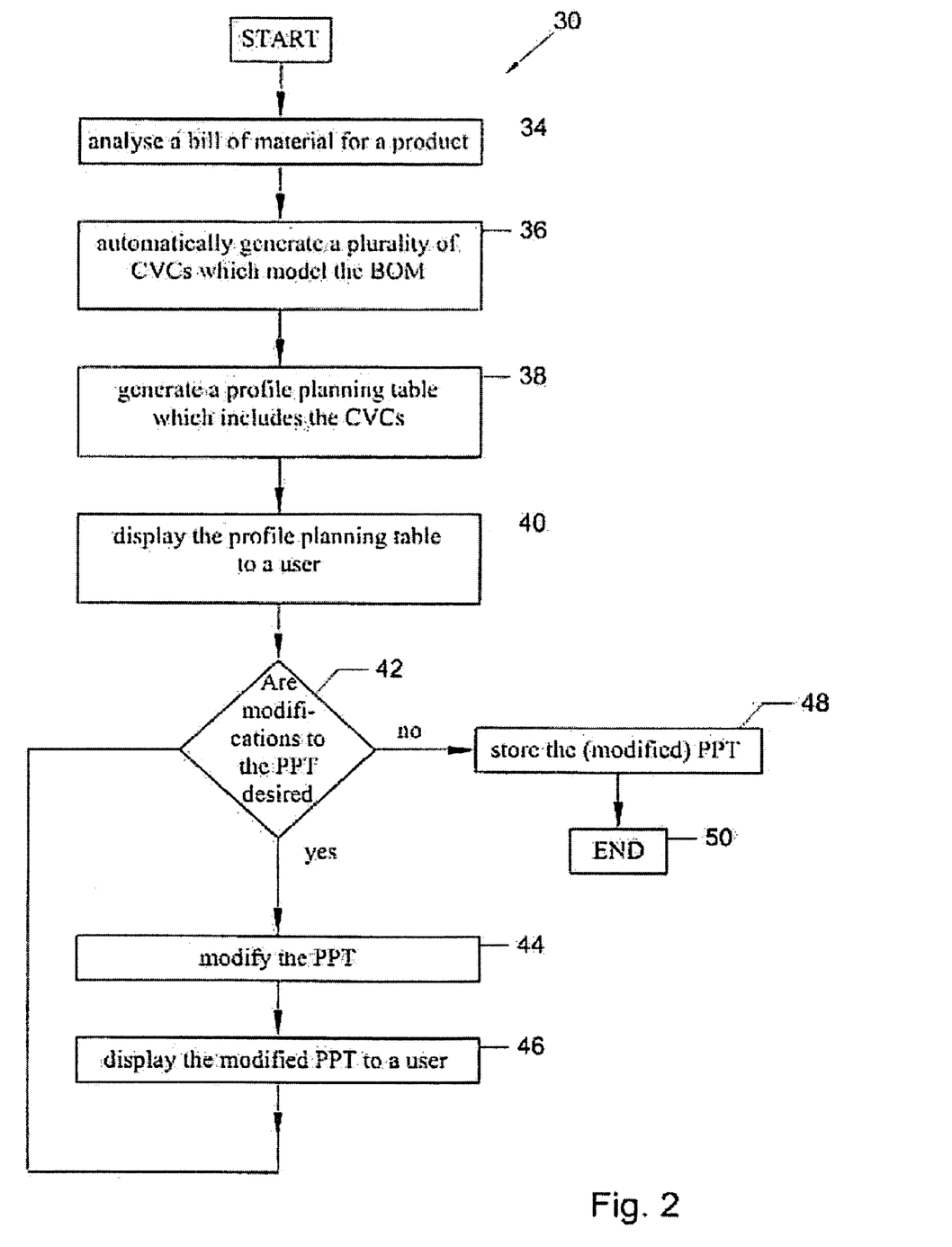
FIG. 2 shows a flow chart showing a modelling of a bill of materials in accordance with an embodiment of the present invention.

FIG. 2 shows steps carried out by the processor in order to manage the supply chain to generate a demand plan in accordance with an embodiment of the present invention. In the process 30, the processor device 20 is arranged to carryout the steps of: starting the process (step 32), analysing a bill of material for a product (step 34), automatically generating a plurality of characteristic value combinations which model the bill of material (step 36), generating a profile planning table which includes the CVCs (step 38), displaying the profile planning table to a user (step 40). Subsequently, the user is given the opportunity to indicate whether any modifications to the PPT are desirable (step 42), if modifications are desirable, the processor device 20 is arranged to modify the PPT (step 44) and to display the modified PPT to the user (step 46). Again, the user is given the opportunity to indicate whether any further modifications are desirable. If they are, steps 44 and 46 are repeated. If no modifications are desirable, either after step 40 or step 46, the processor 20 is arranged to store the PPT or the modified PPT if modifications have been made. The PPT or modified PPT is stored as a characteristics based forecasting table in a data storage element, for example, the LiveCache. The process then ends (step 50).

In further embodiments of the invention the processor may be arranged to carry out further process steps as further described.

According to an embodiment of the present invention, there is provided a method of automatically modelling a relationship between a configurable product and a plurality of components of the configurable product as a bill of materials, wherein the configurable product and the plurality of components are related to one another by a plurality of selection conditions, the method comprising: providing a processor device; generating in demand planning a plurality of characteristic value combinations representing the plurality of selection conditions, modelling the bill of materials using the characteristic value combinations, and using the bill of material to control the supply of the product.

A further embodiment comprises performing a consistency calculation between the characteristic value combinations to explode the bill of materials in the demand planning, to determine the number of components required to produce the product. In this way, the automatic modelling and explosion of the BOM can be carried out entirely in the demand planning without involving the production planning.

A further embodiment comprises generating a planning profile table for the configurable product, wherein the table includes data relating to the product, the generating step comprising: analysing a bill of material for the product and automatically generating a plurality of characteristic value combinations which model the bill of material.

The planning profile table may comprise at least one of primary planning profile table and a secondary profile planning table, the method may further comprise: generating a primary profile planning table for the configurable product, generating a secondary profile planning table for an assembled component of the configurable product including a header characteristic identifying the configurable product of which the assembled component is a component and data relating to the assembled component, processing the data in the primary profile planning table and the secondary profile planning table to generate the demand plan taking into account the assembled component. In a further embodiment, the method comprises substituting the bill of material generated into the demand plan for the product. In this way, the bill of material in the demand plan can be generated without requiring objects from applications outside the demand planning component of the supply chain management application.

In particular, the automatically generating step may include: identifying product characteristics which describe the components of the product on the product level and introducing at least one additional characteristic which describes the selection conditions, wherein the characteristic value combinations comprise the product characteristics and the at least one additional characteristic.

A further embodiment comprises displaying on a graphic user interface the profile planning table, providing a user with an opportunity to modify the profile planning table, and storing a modified profile planning table. In this way, the profile planning table can be modified in accordance with the particular desires of the user. Thus, improving the flexibility of the demand planning application. Further, the profile planning table may be stored.

In a further embodiment, the bill of material to be modelled may be specified. Further, in response to the specifying step, the method may comprise creating a first preview where for every assembly group of the bill of material, a profile planning table is created. In a particular embodiment, the profile planning table comprises only a header of the table and a name corresponding to the assembly group name.

As mentioned, the method may comprise modifying the profile planning table. The modifying step may comprise at least one of deleting, adding and renaming at least an element in the profile planning table. The modifying step may further comprise modifying at least one of the characteristic values displayed in the profile planning table. Further, the method may comprise generating a modified profile planning table in response to the modifying step.

In particular, displaying the modified profile planning table in a graphic user interface. Yet further, the method may comprise displaying in the graphic user interface the profile planning table including a row generated in the generating step, in which row the characteristic value combination is displayed. Further, the profile planning table may be retrievable from a data storage element. In particular, the data relating to at least one of the product and the assembled component are defined by a plurality of characteristics describing properties of the product and the assembled component, respectively, wherein each characteristic is assigned a value, and the data includes characteristic value combinations which are a variable number of uniquely specified characteristic values.

In this way, the processor device carries out the processing to provide a more accurate demand plan without requiring input from any applications or components external of the demand planning component of the application.

The invention as described can be implemented in digital electronic circuitry, or in computer hardware, firmware, software, or in combination thereof. An apparatus according to the present invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While certain features and embodiments of the invention have been described, other embodiments of the invention will be apparent to those skilled in the art from consideration of the specification and practice of the embodiments of the invention disclosed herein. It is intended, therefore, that the specification and examples be considered as exemplary only, with a true scope and spirit of the invention being indicated by the following claims and their full scope of equivalents.

What is claimed is:

1. A method of automatically modeling a relationship between a configurable product and a plurality of components of the configurable product as a bill of materials, wherein the configurable product and the plurality of components are related to one another by a plurality of selection conditions, the method comprising:

generating a planning profile table for the configurable product, wherein the planning profile table includes data relating to the configurable product and at least one of a primary planning profile table and a secondary profile planning table;

generating a plurality of characteristic value combinations representing the plurality of selection conditions;

modeling the bill of materials using the planning profile table and the plurality of characteristic value combinations; and using the modeled bill of material to control a supply of the product;

wherein generating the planning profile table comprises:
generating the primary profile planning table for the configurable product, and
generating the secondary profile planning table for an assembled component of the configurable product including a header characteristic identifying the configurable product of which the assembled component is a component and data relating to the assembled component, and wherein the method further comprises processing the data in the primary profile planning table and the secondary profile planning table to generate a demand plan taking into account the assembled component.

2. The method according to claim 1, comprising:
performing a consistency calculation between the characteristic value combinations in order to determine the number of components required to produce the product.

3. The method according to claim 1, comprising:
automatically generating a plurality of characteristic value combinations which model the bill of material.

4. The method according to claim 1, wherein the bill of material is represented by the plurality of characteristic value combinations in the demand plan.

5. The method according to claim 1, wherein the plurality of characteristic value combinations includes:
identifying product characteristics which describe the components of the product on the product level and introducing at least one additional characteristic which describes the selection conditions, wherein the characteristic value combinations comprise the product characteristics and the at least one additional characteristic.

6. The method according claim 1, comprising:
displaying on a graphic user interface the profile planning table;
providing a user with an opportunity to modify the profile planning table; and
storing a modified profile planning table.

7. The method according to claim 1, comprising:
storing the profile planning table.

8. The method according to claim 1, comprising:
inputting via a graphical user interface components to include in the profile planning table.

9. The method according to claim 1, wherein the profile planning table comprises a header and a name corresponding to an assembly group name.

10. The method according to claim 1, comprising:
modifying the profile planning table via a graphical user interface.

11. The method according to claim 10, wherein the modifying step comprises at least one of deleting, adding and renaming at least an element in the profile planning table via the graphical user interface.

12. The method according to claim 10, wherein the modifying step comprises modifying at least one of the characteristic values in the profile planning table.

13. The method according to claim 10, comprising displaying the modified profile planning table in the graphic user interface.

14. The method according to claim 1, comprising displaying in a graphic user interface the profile planning table, wherein the profile planning table includes data that specifies the characteristic value combination.

15. The method according to claim 1, wherein the data relating to the configurable product and the plurality of components are defined by a plurality of characteristics describing properties of the product and the plurality of components, respectively, wherein each characteristic is assigned a value, and the characteristic value combinations are a variable number of uniquely specified characteristic values.

16. A computer system for automatically modeling a relationship between a configurable product and a plurality of components of the configurable product as a bill of materials, wherein the configurable product and the plurality of components are related to one another by a plurality of selection conditions, the computer system comprising:
    a generating module for generating a planning profile table for the configurable product and generating a plurality of characteristic value combinations representing the plurality of selection conditions, wherein the planning profile table includes data relating to the configurable product, a primary planning profile table for the configurable product, and a secondary profile planning table for an assembled component of the configurable product including a header characteristic identifying the configurable product of which the assembled component is a component and data relating to the assembled component;
    a modeling module for modeling the bill of materials using the planning profile table and the plurality of characteristic value combinations, wherein the modeled bill of material is used to control a supply of the product; and
    a module for processing the data in the primary profile planning table and the secondary profile planning table to generate a demand plan taking into account the assembled component.

17. A computer-readable medium storing program instructions executable by a processor for automatically modeling a relationship between a configurable product and a plurality of components of the configurable product as a bill of materials according to a method, wherein the configurable product and the plurality of components are related to one another by a plurality of selection conditions, the method comprising:
    generating a planning profile table for the configurable product, wherein the planning profile table includes data relating to the configurable product and at least one of a primary planning profile table and a secondary profile planning table;
    generating a plurality of characteristic value combinations representing the plurality of selection conditions;
    modeling the bill of materials using the planning profile table and the plurality of characteristic value combinations; and
    using the modeled bill of material to control a supply of the product,
    wherein generating the planning profile table comprises:
        generating the primary profile planning table for the configurable product, and
        generating the secondary profile planning table for an assembled component of the configurable product including a header characteristic identifying the configurable product of which the assembled component is a component and data relating to the assembled component, and
    wherein the method further comprises processing the data in the primary profile planning table and the secondary profile planning table to generate a demand plan taking into account the assembled component.

* * * * *